United States Patent [19]

Herman

[11] Patent Number: 4,570,356

[45] Date of Patent: Feb. 18, 1986

[54] ELEVATOR INDICATOR SUPPORT-BOW GAGE ASSEMBLY

[76] Inventor: Martin A. Herman, 2085 W. 114th St., Cleveland, Ohio 44102

[21] Appl. No.: 572,528

[22] Filed: Jan. 20, 1984

[51] Int. Cl.⁴ .............................................. G01B 5/20
[52] U.S. Cl. ...................................................... 33/552
[58] Field of Search .......... 33/172 B, 174 L, 174 PA, 33/174 PB

[56] References Cited

U.S. PATENT DOCUMENTS

| | | | |
|---|---|---|---|
| 2,709,854 | 6/1955 | Price | 33/174 PB |
| 2,879,602 | 3/1959 | Powers | 33/174 PB |
| 2,964,850 | 12/1960 | Herman | 33/174 PB |
| 2,977,533 | 3/1961 | Savage | 33/174 PA |
| 2,999,282 | 9/1961 | Herman | 33/174 PB |
| 3,650,035 | 3/1972 | Mueller | 33/174 PB |

FOREIGN PATENT DOCUMENTS 112004  9/1964  Czechoslovakia .............. 33/174 PA Primary Examiner—Richard R. Stearns
Attorney, Agent, or Firm—Oldham, Oldham & Weber Co.

[57] ABSTRACT

The elevator type gage assembly has a plurality of vertically spaced support members, that can be secured to an associated gage, each of which has a gage template operatively positioned therein and wherein a vertically extending support rod is secured to and extends between a pair of the support members and it has an indicator sleeve bracket rotatably and vertically slidably engaged therewith which bracket has a portion for engaging a laterally outer end of a support member to aid in adjusting the gage while an indicator is operatively secured to the indicator sleeve bracket; a contact arm is pivotally carried by the indicator sleeve bracket with an end portion for engaging a laterally outer end of a gage template and a second end portion to engage the indicator operating pin to provide a reading on the indicator of the position of the slide template in the associated gage.

10 Claims, 11 Drawing Figures

ELEVATOR INDICATOR SUPPORT-BOW GAGE ASSEMBLY

BACKGROUND ART

Heretofore, a relatively sizable number of gages corresponding in general to the structure shown in my previously issued U.S. Pat. No. 2,999,282 have been built and used successfully commercially for gaging and inspecting of a variety of articles and large quantities of articles have been tested satisfactorily in such gages. In gages of this type, it is possible to record or measure the position of a laterally outer end of a template that is slidably mounted in a carrier cartridge mounted on a support post, column or the like in the gage. This laterally outer end of the slide template is accurately correlated in size or position in relation to the position of the laterally inner end of the gage as it engages one surface of the test article. In these prior gages, a plurality of indicators have been used, normally, adjacent each lateral margin of the apparatus for indicating or measuring the size or contour of the test specimen article at a plurality of levels of the test article. Usually a plurality of indicators that have needed to be operatively positioned on each lateral margin of the gage have the test article positioned at the central portion of the gage.

Use of a plurality of the indicators on any gage has made the apparatus bulky and it has been time consuming to set the individual indicators for them to correlate their measuring actions.

DISCLOSURE OF THE INVENTION

It is a general object of the present invention to provide new and improved indicator means on gages used for measuring a plurality of vertically spaced portions of a test article for checking the dimensions or contour of the test article.

Another object of the invention is to provide a readily movable indicator in a gage apparatus whereby the indicator can be moved vertically and be brought into operative engagement with vertically spaced parts of the apparatus for accurately measuring the positions of various templates in the apparatus.

Yet another object of the invention is to provide gage means that is more efficient to use and has less component parts therein than prior types of gages but which can provide accurate, positive measurements on a plurality of locations in a test article.

Yet another object of the invention is to provide a novel elevator and support rod in a gaging apparatus attachable to a gage means to position an indicator onto the apparatus for correlating measurements on a test specimen and for accurately and promptly reading a plurality of vertically spaced dimensions on a test article.

The foregoing and other objects and advantages of the invention will be made more apparent as the specification proceeds.

BRIEF DESCRIPTION OF THE DRAWINGS

Reference is now made to the accompanying drawings, wherein.

When referring to corresponding members shown in the drawings and referred to in the specification, corresponding numerals are used to facilitate comparison therebetween.

BEST MODE FOR CARRYING OUT THE INVENTION

Figure 1:
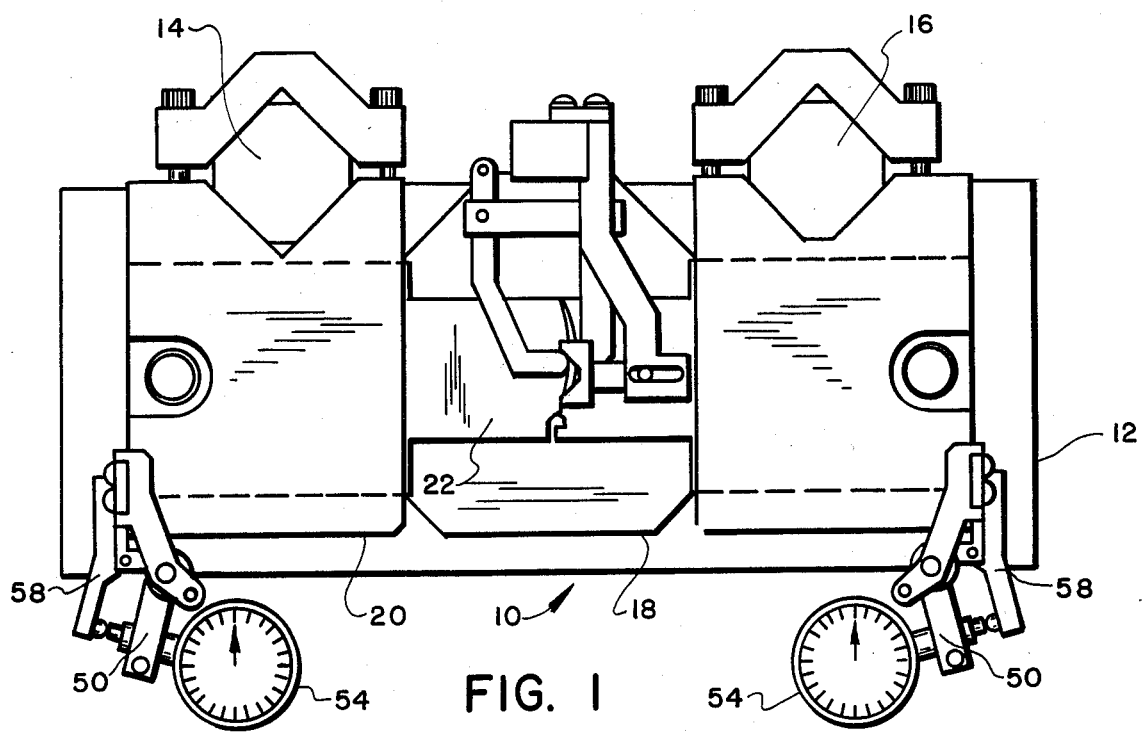
FIG. 1 is a plan view of a gage having the elevator type gage assembly of the invention operatively associated therewith.
Figure 2:
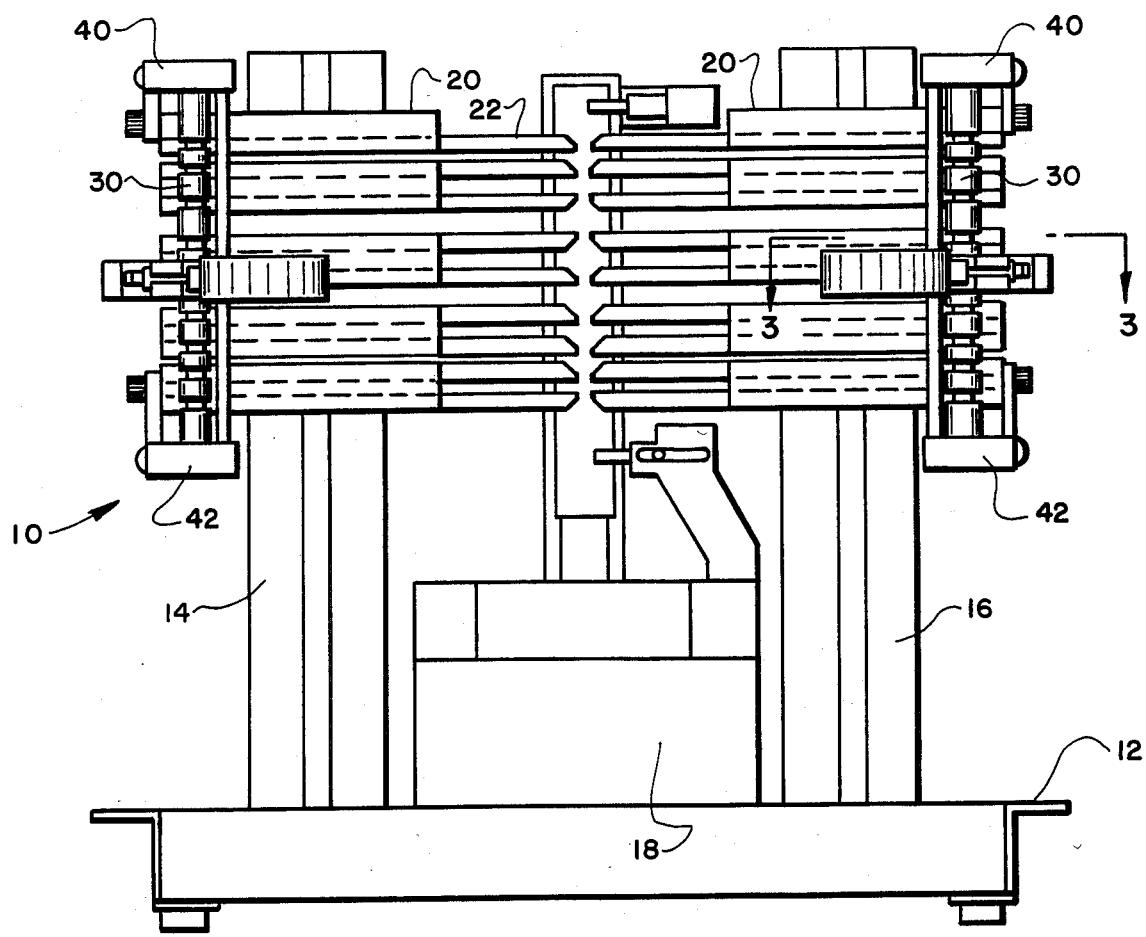
FIG. 2 is a front elevation of the gage apparatus as shown in FIG. 1.
Figure 7:
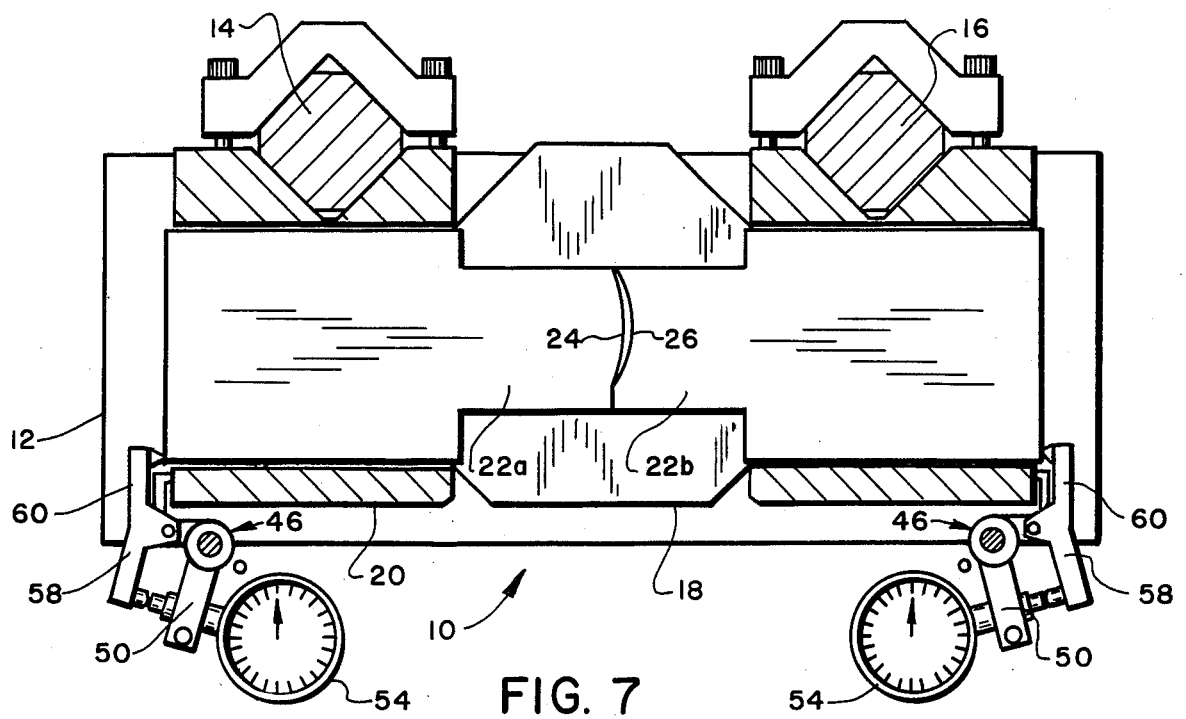
FIG. 7 is a sectional view, partially shown in plan, of one template and mounting means portion of the apparatus of the invention and partially shown in horizontal section.
Figures 8, 9, 10, 11:
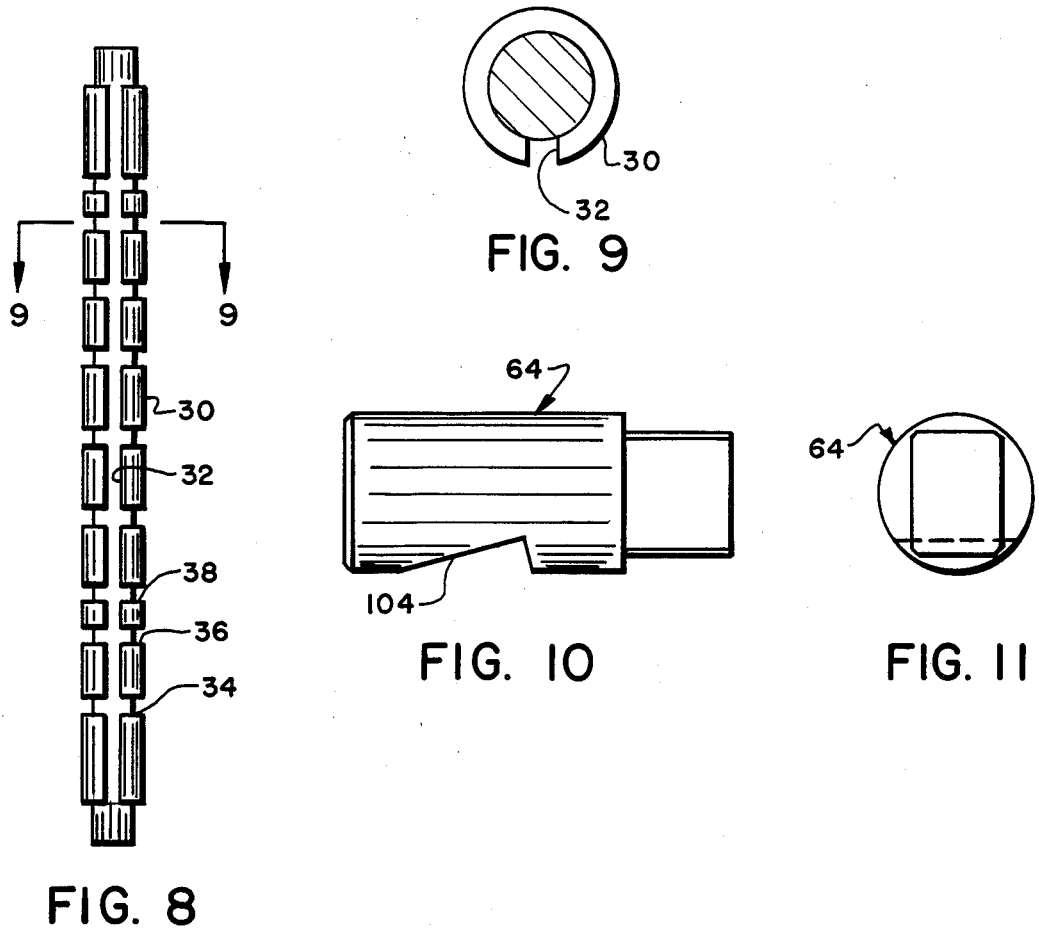
FIG. 8 is an elevation of a mounting rod for the gage means of the invention.
FIG. 9 is a section on line 9—9 of FIG. 8.
FIG. 10 is an elevation of the guide pin used in the gage assembly.
FIG. 11 is an end elevation of the guide pin of FIG. 10.

With reference to the details shown in the accompanying drawings, a gage of the type shown in my prior U.S. Pat. No. 2,999,282 is shown and such gage 10 includes a base 12, a pair of columns or support posts 14 and 16 and such posts or support columns 14 and 16 are positioned in spaced relationship on the base 12 and the base may also support an article test mount member or support means 18 whereby a test article, not shown, can be secured to such support 18 and normally extend vertically of the gage intermediate the support posts 14 and 16. A plurality of template mounting means, or cartridges 20 are secured to each of the support post in the spaced relationship as indicated in FIGS. 1 and 2 of the drawings. Each of these support cartridges 20 operatively positions an article engaging template 22 slidably thereon. These templates 22 are of known design and may have contoured laterally inner edges or ends 24 or 26 as provided on the templates 22a and 22b illustrated in FIG. 7. Thus the template ends 24 and 26 are designed to engage with opposed surfaces of the test article and to accurately gage the same as to whether or not the test article is of the desired size and contour for the vertical location of the test article engaged by the template. All of this is done in accordance with conventional practice. It further is conventional to measure the location of the inner ends of the templates by a gage member or indicator operatively contacting or engaging the laterally outer ends of the templates 22 so as to reflect its engagement with the test article at the opposite end of the template.

As a novel and important feature of the present invention, a vertically extending support rod 30 is operatively positioned on each of the support posts 14 and 16 by cartridges 20. Such support rod 30 has a vertically extending slot or recess 32 formed therein, and a plurality of vertically spaced annular slots or recesses 34, 36, 38, etc. are also formed on the support rod 30 with such horizontal slots normally being spaced vertically from each other distances corresponding to the vertical locations of the plurality of support cartridges 20 carried by the individual support posts.

Figure 3:
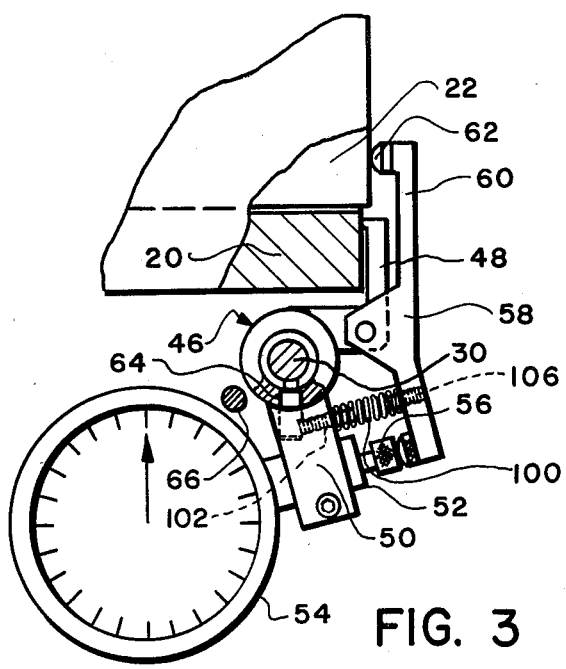
FIG. 3 is an enlarged fragmentary sectional view taken on line 3—3 of FIG. 2 and showing the operative position of an elevator gage assembly of the invention.
Figure 4:
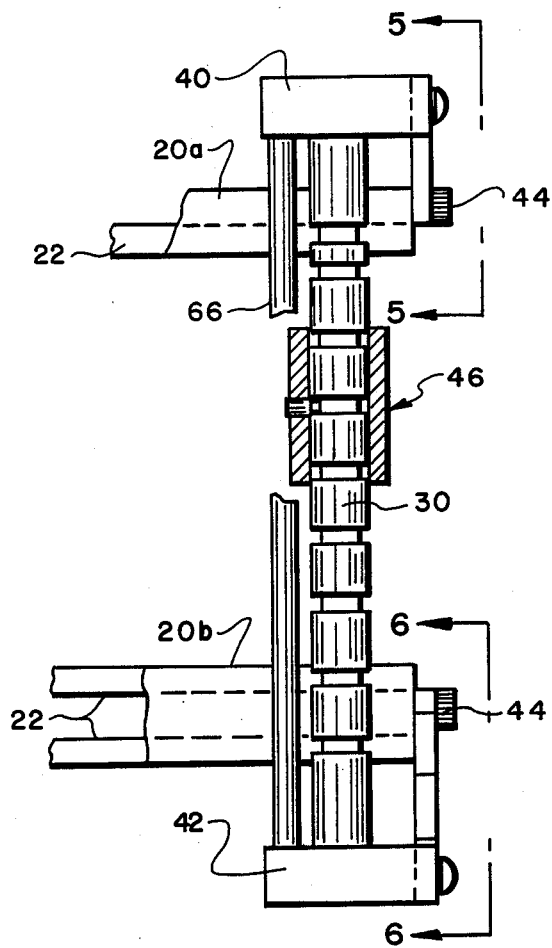
FIG. 4 is an elevation of the elevator gage means and associated members of FIG. 3.
Figure 5:
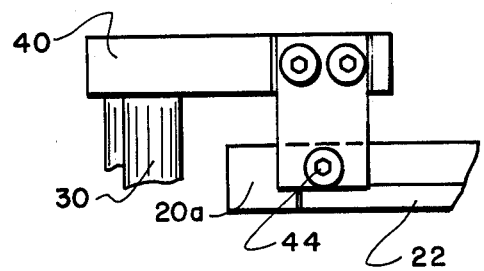
FIG. 5 is a fragmentary elevation taken on line 5—5 of FIG. 4.

To mount the support rods 30 on the individual support posts 14 and 16, preferably I provide upper and lower mounting brackets 40 and 42 respectively, that, as best shown in FIG. 4 can be and are operatively secured to outer ends of vertically spaced cartridges 20a and 20b as by cap screws 44 or the like. These brackets 40 and 42 may have a recess or hole therein for engaging an end portion of the support rod 30 which extend the operative length of the support posts and each of the supports rod 30 has an indicator sleeve bracket 46 operatively engaged therewith. This indicator sleeve bracket 46 has a fixed contact arm 48 extending therefrom which can be brought into engagement with the laterally outer end of one of the support cartridges 20 to measure its position and limit arcuate movement of the sleeve bracket on the rod. The sleeve bracket 46 also has an indicator mounting or carrier arm 50 extending therefrom and it is adapted to engage the mounting stem portion 52 of an indicator 54 thereon. This indicator 54 is positioned in a horizontal plane, normally, and is held in operative association with the indicator sleeve bracket 46 and has an operating arm or pin 56 extending therefrom by which the indicator pointer is controlled. The pin can move on the axis of the indicator support member 52 and is adapted to engage with one end of a second contact arm 58 that is in turn pivotally mounted intermediate its ends on the contact arm 48 of the indicator sleeve bracket, as best shown in FIG. 3. Such contact arm 58 has a contact finger 60 extending therefrom adapted to extend to the laterally outer end of one of the templates 22 and a pointer or contact pin 62 is carried by this contact finger for engaging this template outer end. Hence, the position of the pivotal contact arm 48 on the bracket 46 is controlled by its engagement with the cartridge 20 and then the position of the contact finger or device mounted on one of the portions of the contact arm 48 is turned controlled by the position of the template engaging the test part so as to move the indicator or operating pin 56 and have the indicator 54 reflect the position of the outer end of the template 22. This shows accurately the positioning of the laterally inner end of the template and its engagement with the test specimens for accurately measuring the same.

It can be seen that a suitable set screw or lock pin 64 engages the sleeve portion of the indicator sleeve bracket 46 and extends radially inwardly thereof sufficiently to engage the slots 32, 34, et al formed in the support rod 30.

It is a further feature of the invention that the support rods 30 are so positioned and retained in position in the operative engagement with the gage 10 that the vertically extending slot 32 is readily available for this set screw or pin 64 to engage therewith and permit either arcuate or rotary movement of the sleeve bracket in a horizontal plane to bring the contact arms and fingers into operative engagement with the gage member, or else the lock pin 64 will permit this sleeve bracket to be moved vertically of the gage in the vertical slot.

It should be noted that the arcuate movement of the indicator sleeve bracket 46 on its support rod can be controlled by a support or limit rod 66 that is secured to and carried by and extends between the upper and lower mounting brackets 40 and 42. The limit rod is in such a position as to limit the spring biased arcuate movement of the sleeve bracket in a given horizontal plane by a portion of the contact arm 48 striking the limit rod 66 as indicated in FIG. 3.

It will be realized that the constructions on opposite sides of the center portion of the gage 10 are the same and only one of them has been specifically described herein. The bracket 42 has a support arm 43.

By the present invention, the one indicator 54 can be moved vertically relatively easily and rapidly in a controlled manner whereby it can be brought into engagement with the vertically spaced templates 22 individually and have accurate readings from different sections of the test article provided on the indicator. The indicator is, of course, adjusted to suitable zero and accurate setting relationship in a conventional manner such as by having the indicator take a zero reading when one of the sections of the contact arm 48 is engaged with the cartridge end and the contact finger 60 is engaged with the laterally outer end of the template plate. These members have been positioned in vertical alignment with each other as by use of a flat surfaced magnet engaging the laterally outer ends thereof.

Figure 6:
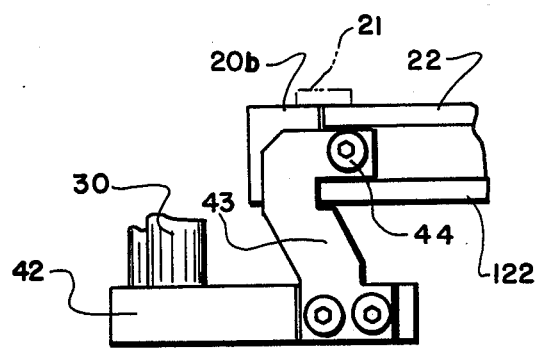
FIG. 6 is a fragmentary elevation taken on line 6—6 of FIG. 4.

Gibs, like the gib 21, FIG. 6, are suitably secured to the cartridges 20 to retain the templates in slidable engagement therewith. A cartridge 20b may mount templates 22 and 122 on top and bottom surfaces thereof.

FIG. 3 shows that a spring 100 is compressed between the contact arm 58 and the carrier arm 50. The spring 100 at one end engages a set screw 102 that is in threaded engagement with the indicator sleeve bracket 46. Such set screw 102 seats on a recessed surface 104 on the guide pin to retain it in position. The spring 100 seats at the other end on a set screw 106 engaging the contact arm 58. Such spring 100 hence aids in bringing or maintaining an end of the contact arm 58 in engagement with the outer end of the template 22. Spring 100 is omitted in some drawings for clarity.

The apparatus of the invention can be used with any known gage to provide a compact, efficient indicator reading action.

While one complete embodiment of the invention has been disclosed herein, it will be appreciated that modification of this particular embodiment of the invention may be resorted to without departing from the scope of the invention.

What is claimed is:

1. An elevator type gage assembly for attachment to a gage having a plurality of vertically spaced support members therein and gage templates slidably carried by said support members for engaging a test article and comprising:

a vertically extending support rod operatively positioned by and extending between a pair of said support members;

an indicator sleeve bracket slidably engaging said support rod and having a portion thereon for engaging a laterally outer end of a support member;

an indicator secured to said indicator sleeve bracket and having an operating device extending therefrom, and a contact arm pivotally carried by said indicator sleeve bracket, said contact arm having an end portion for engaging a laterally outer end of a gage template and an end portion for engaging said operating device of said indicator whereby said contact arm will provide a reading on said indicator to show a size of a test article engaged by a said gage template.

2. An elevator type gage assembly as in claim 1 where said support rod has an axially extending slot and a plurality of annular slots at right angles to said axial slot and spaced distances corresponding to the spacing of said support members, and a device on said indicator sleeve bracket and engaging said slots on said support rod to permit vertical movement and annular movement of said indicator sleeve bracket on said support rod whereby the positions of different ones of said gage templates can be measured.

3. An elevator type gage assembly as in claim 2 where a mounting bracket is positioned on each of said pair of said support members and said support rod is engaged by and extends between said mounting brackets, a stop rod is secured to and extends between said mounting brackets and a portion of said indicator sleeve bracket contacts said stop rod when said device engages said axial slot in said support rod to permit vertical movement of said indicator sleeve bracket.

4. An elevator type gage assembly as in claim 1 where each of said gage templates slides in and defines different horizontal planes, and said indicator sleeve bracket is positionable in the same plane as a said gage template to measure the position thereof on said indicator.

5. An elevator type gage assembly as in claim 1 where said support rod has an axially extending slot and a plurality of annular slots spaced distances corresponding to the spacing of said support members, and said indicator sleeve bracket being slidably engaged with said slots on said support rod to limit it to vertical movement and annular movement on said support rod whereby the positions of different ones of said gage templates can be measured.

6. An elevator type gage assembly as in claim 1, where said indicator sleeve bracket has an arm thereon for engaging a laterally outer end of a support member to aid in operatively positioning said indicator sleeve bracket and said contact arm.

7. An elevator type gage assembly as in claim 6, where spring means are operatively positioned between portions of said contact arm and indicator sleeve bracket to urge said first mentioned end portion of said contact arm normally towards the laterally outer end of said gage template.

8. An elevator type gage assembly for attachment to a gage having a pair of vertically extending support posts, a plurality of vertically spaced support members secured to each of said support posts, and a gage template individually slidably carried by each said support member for engaging a test article, said gage templates having laterally outer ends and comprising:

a vertical support rod secured to and extending between a pair of said support members adjacent laterally outer ends of said gage templates, an indicator sleeve bracket slidably engaging said support rod and having a portion thereon for engaging a laterally outer end of a support member;

an indicator secured to said indicator sleeve bracket and having an operating pin extending therefrom, and a contact arm pivotally carried intermediate its ends by said indicator sleeve bracket, said contact arm having an end portion for engaging a laterally outer end of a gage template and a second end portion for engaging said operating pin of said indicator whereby said contact arm will provide a reading on said indicator to show a size of a test article engaged by a said gage template.

9. An elevator type gage assembly for attachment to a gage having a plurality of vertically spaced support members therein and gage templates slidably carried by said support members for engaging a test article and comprising:

top and bottom mounting brackets attachable to a spaced pair of said support members;

a vertical support rod engaged by and extending between said top and bottom mounting brackets;

an indicator sleeve bracket slidably engaging said support rod and having a portion thereon for engaging a laterally outer end of a support member;

an indicator secured to said indicator sleeve bracket and having an operating pin extending therefrom, and a contact arm pivotally carried by said indicator sleeve bracket, said contact arm having one end for engaging a gage template and an opposite end portion for engaging said operating pin of said indicator whereby said contact arm will provide a reading on said indicator to show a size of a test article engaged by a said gage template.

10. An elevator type gage assembly as in claim 9 where said support rod has an axially extending slot and a plurality of transversely extending annular slots spaced distances corresponding to the spacing of said support members, and a device on said indicator sleeve bracket and engaging said slots on said support rod to permit vertical movement and annular movement of said indicator sleeve bracket on said support rod whereby the positions of different ones of said gage templates can be measured.

* * * * *